(12) United States Patent
Rossi (10) Patent No.: US 8,095,736 B2
(45) Date of Patent: Jan. 10, 2012

(54) METHODS AND SYSTEMS FOR DYNAMIC CACHE PARTITIONING FOR DISTRIBUTED APPLICATIONS OPERATING ON MULTIPROCESSOR ARCHITECTURES

(75) Inventor: Frederic Rossi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 990 days.

(21) Appl. No.: 12/036,599

(22) Filed: Feb. 25, 2008

(65) Prior Publication Data
US 2009/0216953 A1    Aug. 27, 2009

(51) Int. Cl.
*G06F 12/08* (2006.01)
(52) U.S. Cl. ......... 711/129; 711/128
(58) Field of Classification Search ......... None
See application file for complete search history.

(56) References Cited

U.S. PATENT DOCUMENTS

| | | | |
|---|---|---|---|
| 5,875,464 A | 2/1999 | Kirk | |
| 6,295,580 B1 | 9/2001 | Sturges et al. | |
| 6,493,800 B1 | 12/2002 | Blumrich | |
| 6,606,686 B1 * | 8/2003 | Agarwala et al. | 711/129 |
| 6,694,407 B1 * | 2/2004 | May et al. | 711/129 |
| 6,745,292 B1 | 6/2004 | Stevens | |
| 7,225,300 B1 * | 5/2007 | Choquette et al. | 711/146 |
| 7,246,202 B2 * | 7/2007 | Morishita et al. | 711/129 |
| 7,290,116 B1 | 10/2007 | Grohoski et al. | |
| 2002/0174301 A1 * | 11/2002 | Conway et al. | 711/129 |
| 2002/0178329 A1 * | 11/2002 | Chaudhry et al. | 711/122 |
| 2006/0095680 A1 | 5/2006 | Park et al. | |
| 2007/0143546 A1 | 6/2007 | Narad | |

FOREIGN PATENT DOCUMENTS
WO    2006082554 A2    8/2006

OTHER PUBLICATIONS
International Search Report from corresponding PCT Application No. PCT/IB2009/050696.

* cited by examiner

*Primary Examiner* — Kaushikkumar Patel
(74) *Attorney, Agent, or Firm* — Alex Nicolaescu; Ericsson Canada Inc.

(57) ABSTRACT

Software, systems and methods are described which provide cache management capabilities. The number of cache sets to be used in each partition of the cache memory space is based on a number of cache pages in each partition and an associativity level associated with the set associative cache. The cache sets can be numbered based on the partition number, a total number of partitions and a cache page index. Cache management according to these exemplary embodiments reduces problems associated with cache trashing in multiprocessor environments sharing common data structures in set associative caches.

24 Claims, 6 Drawing Sheets

|  | Page cache c=0 | Page cache c=1 | Page cache c=2 | Page cache c=3 | Page cache c=4 | Page cache c=5 |
|---|---|---|---|---|---|---|
| Partition 0 | 0 | 4 | 8 | 12 | 16 | 20 |
| Partition 1 | 1 | 5 | 9 | 13 | 17 | 21 |
| Partition 2 | 2 | 6 | 10 | 14 | 18 | 22 |
| Partition 3 | 3 | 7 | 11 | 15 | 19 | 23 |

Fig-6a

| BA | Way | Set | Index | Cache Page Number |
|---|---|---|---|---|
|  | 0 | 1 |  | 0 |
|  | 1 | 1 |  | 1 |
|  | 0 | 5 |  | 2 |
|  | 1 | 5 |  | 3 |
|  | 0 | 9 |  | 4 |
|  | 1 | 9 |  | 5 |

Fig-6b

Fig-7

METHODS AND SYSTEMS FOR DYNAMIC CACHE PARTITIONING FOR DISTRIBUTED APPLICATIONS OPERATING ON MULTIPROCESSOR ARCHITECTURES

TECHNICAL FIELD

The present invention generally relates to data processing systems and methods and, more particularly, to mechanisms and techniques for cache management in multiprocessor systems.

BACKGROUND

Applications which are being run on data processing systems employing parallel or multiple processor architectures will typically employ cache memory to bring data closer to the processor which is operating on that data. Cache memories are typically implemented as smaller, faster memory devices which store copies of the data from the most frequently used main memory locations. An issue associated with the use of cache memories is the design tradeoff between cache latency and cache hit rate. Larger caches have better hit rates, i.e., the percentage of times that a request for data from the cache can be filled by a stored data copy, but longer latency, i.e., the amount of time needed to serve a request. To address this tradeoff, some architectures use multiple levels of cache, with small fast caches (sometimes called Level 1 or L1 caches) backed up by larger, slower caches (sometimes called Level 2 or L2 caches).

There are three general ways to architect the relationship between main memory locations and memory locations within a cache memory. First, the cache memory can be directly mapped to the main memory such that there is one and only one cache memory location in which data associated with each main memory location can be stored. Second, at the other end of the spectrum, the cache memory can be fully associatively mapped to the main memory using a rule set which permits each main memory location to be mapped to any of the cache memory locations. Thirdly, between the first and second options, a set associative approach provides for each main memory location to be mapped to one of the cache memory locations within a particular subset of all available cache memory locations. More specifically, memory addresses are placed into cache sets according to their tag. When a replacement is due to find room for new address tag, a cache line is chosen by the processor following some internal criteria and then replaced. This latter, set associative technique is of particular interest for the present application.

Cache sharing impacts the performance of distributed applications running on multiple processors or cores (in this specification the terms "processor" or "processors" are used interchangeably with the terms "core" or "cores", respectively). As shown for example in FIG. 1, a distributed software application can be considered to be an application running on multiple cores 100-106 and sharing data structures. The distributed application receives traffic from one or several network interfaces 108-112 and uses a configurable hardware or software packet input engine 114 to distribute packets to the cores (or to make packets available to the cores).

Figure 1:
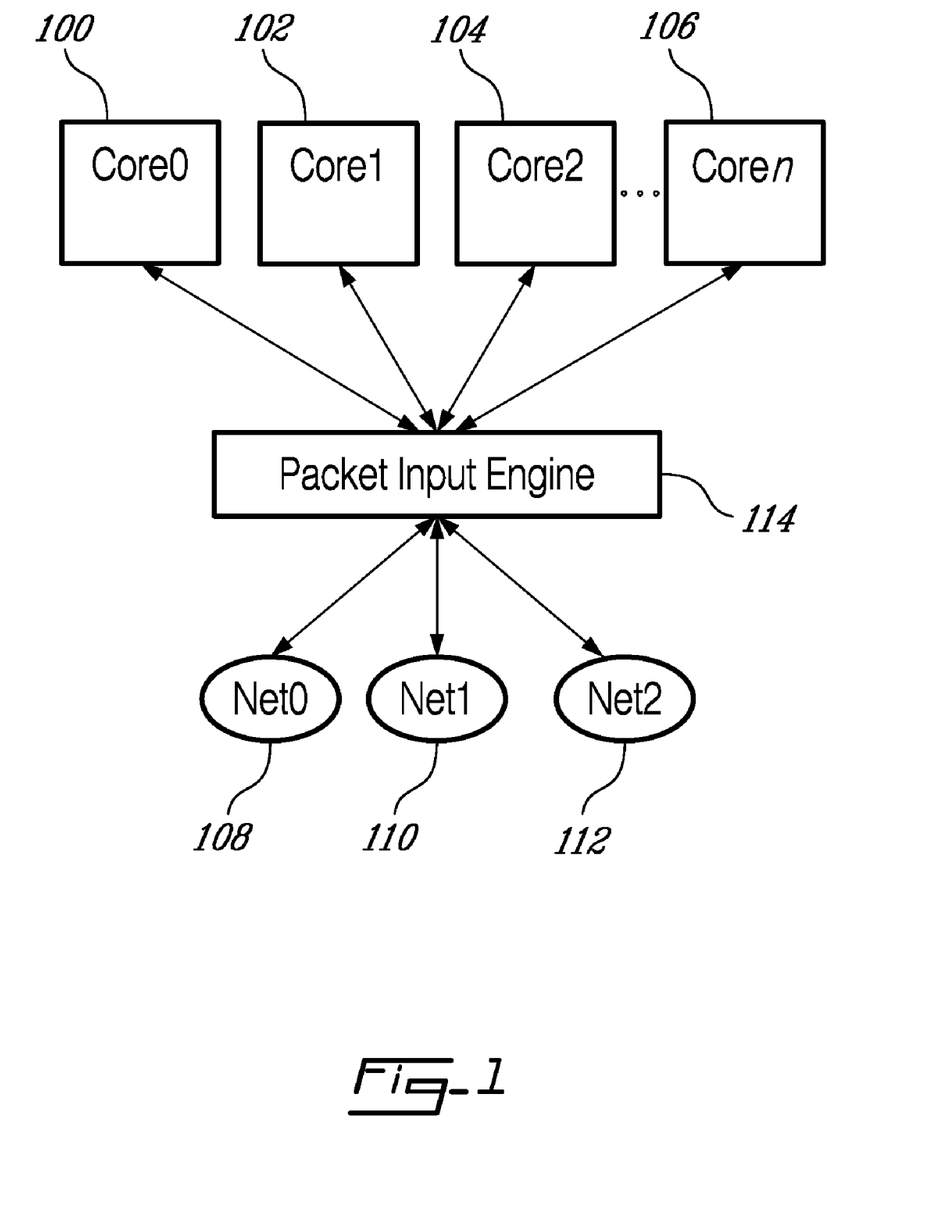
FIG. 1 illustrates an information processing system in which exemplary embodiments can be implemented.

The packet input engine 114 is typically configured to provide a fair distribution of traffic among the cores 100-106 and to be able to re-organize the quantity of traffic each core can handle as the traffic varies. The packet input engine 114 can, for example, be implemented as hardware circuitry for scheduling input packets on the network interfaces for the cores or as a software packet filter running with the network interface drivers and pushing packets into core specific input queues. Once the packets are, for example, ordered into core specific input queues, a shared hash table can be used to lookup the corresponding data based on the packet information as input. For example such a lookup could be based on the 5-upple [source IP, destination IP, source port, destination port, protocol].

Hash tables are widely used to speedup data lookup and prevent collisions (e.g., due to similar data) by evenly distributing data into the table. This advantage becomes an issue for set associative L2 caches since hash results become suddenly spread all over the cache sets in a random fashion. This is likely to happen due to, for example, traffic growing in terms of address range and the fact that the L2 cache is shared between the cores. This, in turn, causes cache misses due to inter-processor conflicts, this phenomena is sometimes also referred to as "cache trashing" or "cache set invasion". More specifically, cache set invasion is caused by an application running on one core stealing the set associative, L2 cache sets of the same application running on another core but with different input data. This makes the application's behavior prediction, resource usage and traffic shaping difficult to manage.

Accordingly, it would be desirable to provide software, methods, devices and systems which address these, and other, problems associated with cache management in multiprocessor systems.

SUMMARY

According to one exemplary embodiment, a method for managing a cache memory space includes determining a number of cache sets to be used in a partition of the cache memory space based on a number of cache pages in the partition and an associativity level associated with the cache memory space, numbering the cache sets based on a partition number, a total number of partitions and a cache page index, and partitioning the cache memory space using the determined number of cache sets and the numbering of the cache sets.

According to another exemplary embodiment, a system for managing a cache memory space includes a cache memory unit including the cache memory space, and a processor for determining a number of cache sets to be used in a partition of the cache memory space based on a number of cache pages in the partition and an associativity level associated with the cache memory space, numbering the cache sets based on a partition number, a total number of partitions and a cache page index, and partitioning the cache memory space using the determined number of cache sets and the numbering of the cache sets.

According to still another exemplary embodiment, a computer-readable medium contains instructions which, when executed on a computer, perform the steps of determining a number of cache sets to be used in a partition of the cache memory space based on a number of cache pages in the partition and an associativity level associated with the cache memory space, numbering the cache sets based on a partition number, a total number of partitions and a cache page index, and partitioning the cache memory space using the determined number of cache sets and the numbering of the cache sets.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to exemplary embodiments, inter-core conflicts are reduced in multiprocessor systems which employ a set associative L2 cache by, for example, partitioning the memory blocks given by a cache aware memory engine (CAME) in such a way that partitions are mapped to specific cache sets. As a result the partitions will provide information regarding how to redistribute data managed by the processor cores. Cache line replacement according to these exemplary embodiments becomes dependent upon whether other cache lines in the same set have been accessed or not. Using a partitioned hash table, cache line replacement is also dependent on the processor core doing the data lookup. However, since each set becomes core dependent because of the partitions according to these exemplary embodiments, a cache miss occurring on one core will not impact the cache sets of the other cores. Note that although the following exemplary embodiments are described in the context of implementations involving a hash table that the present invention is not so limited and may, for example, be applied to other common data structures shared by multiple processors, e.g., such as variables, tables, structures, data bases and the like.

Figure 2A:
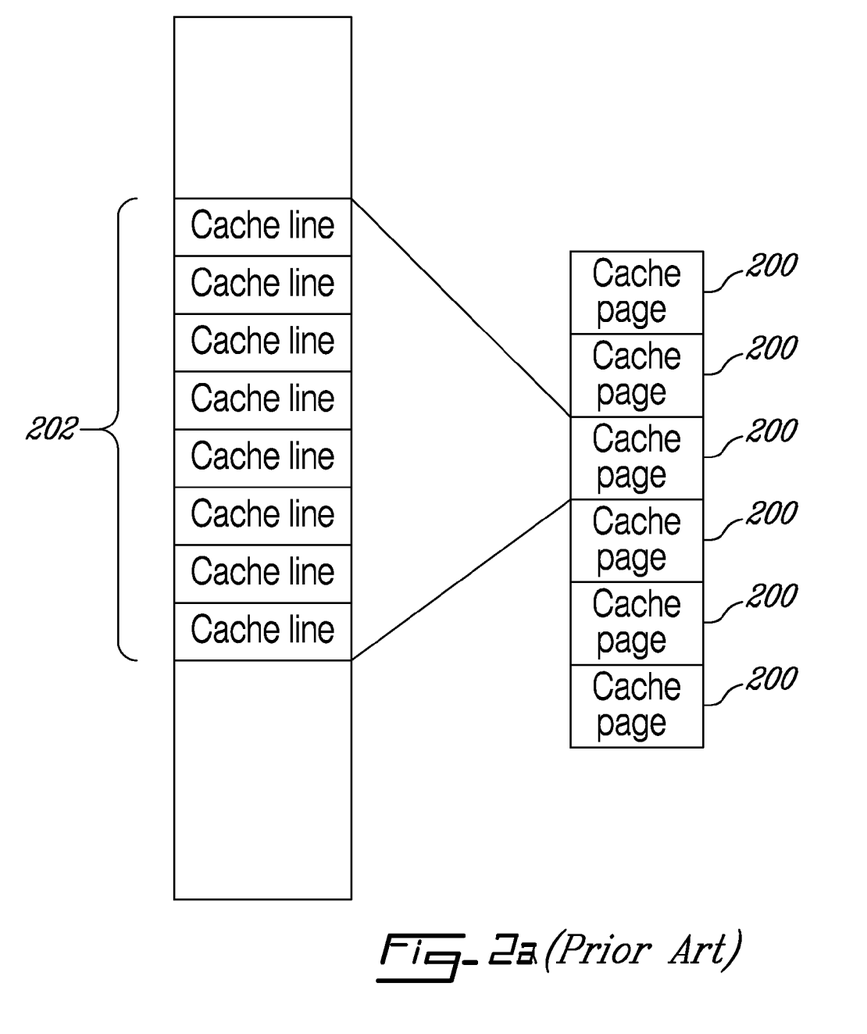
FIG. 2(a) depicts general aspects of cache memory organization.
Figure 2B:
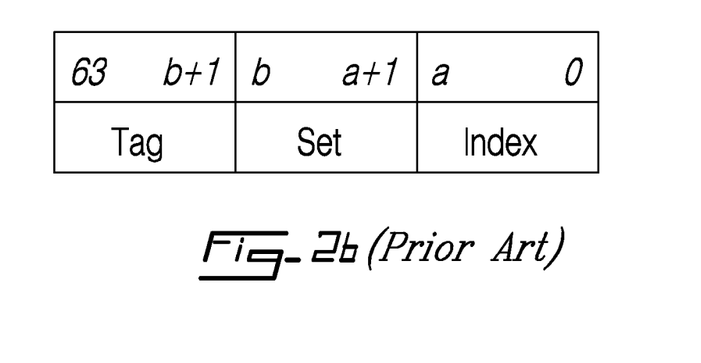
FIG. 2(b) shows a conventional addressing format for cache memory.

To provide some context for the discussion of cache management according to these exemplary embodiments, the exemplary multiprocessor (or multicore) processing system of FIG. 1 will again be used as an exemplary implementation environment. In such a system, a set associative L2 cache can be employed which is organized into a number of cache pages 200 as shown in FIG. 2(a). Therein, each cache page 200 is a block of memory in RAM which contains a number of cache line entries 202. As mentioned above, for set associative caches, each address in main memory can be allocated to any of a plurality of cache lines within a predetermined set, i.e., a cache set. In a conventional n-way set associative L2 cache organization, addresses are typically split into three parts, i.e., a tag part, a set part and an index part, as shown in FIG. 2(b). Therein, the size of the index part of the address satisfies the criterion that $2^{a+1}$=CLS, where the cache line size is CLS. The sizes of the set and tag parts of the address in FIG. 2(b) are specific to the processor cache access address format of the particular implementation of interest. A cache page can be defined as a block of memory of size CPS=CLS×W, where CPS is the cache page size and W is the cache way order. For example, on a 8-way cache processor with a cache line size of 128 bytes, the cache page size would be 8 Kb. As will be described below with respect to FIG. 5, exemplary embodiments provide for a different addressing scheme in support of hash table partitioning which will reduce or eliminate the cache set invasion problem.

Figure 3:
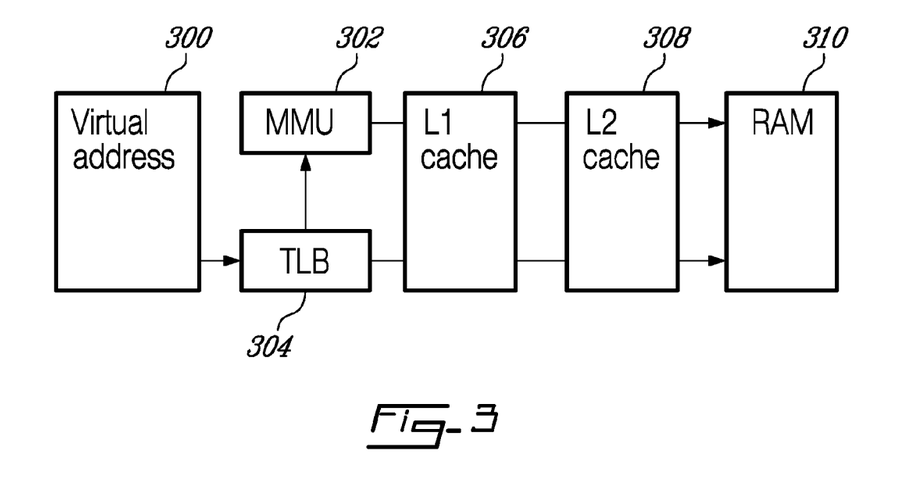
FIG. 3 shows an exemplary layered memory architecture.

Operating systems running on processors using a multiple level, paged memory addressing mechanism might only expose virtual addresses to the user programs. As shown in FIG. 3, these virtual addresses 300 can, for example, be converted to physical addresses by a memory management unit (MMU) 302 prior to accessing the set associative L2 cache 308, which technique is sometimes referred to as "physical tagging". The latest address translations can be stored in a cache memory device typically referred to as a translation lookaside buffer (TLB) 304 to speedup the translation. The physical address, output from either the MMU 302 or TLB 304, is then used to address the multilayer cache, including L1 cache 306 and set associated L2 cache 308, and ultimately main memory (RAM) 310. An alternative cache memory management technique, sometimes referred to as "virtual tagging", locates the L2 cache 308 before the MMU translation 302 and, thus, addresses the L2 cache 308 using virtual addresses. Exemplary embodiments of the present invention can be applied to either of these types of multiple level, paged memory addressing mechanisms.

Figure 4:
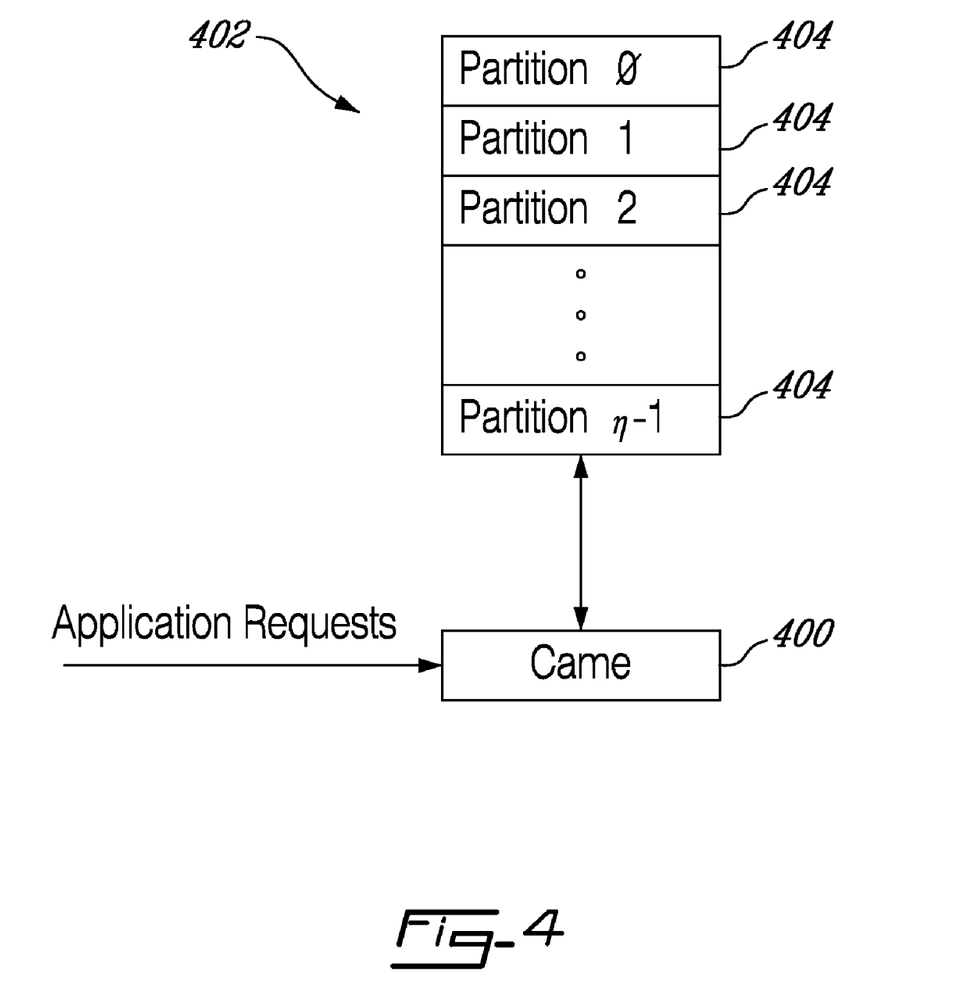
FIG. 4 illustrates a cache memory engine and partitioned cache memory space according to an exemplary embodiment.

According to exemplary embodiments, as illustrated generally in FIG. 4, a cache aware memory engine (CAME) 400 initially allocates a chunk 402 of cache memory 308 (also referred to herein as the "cache memory space") to be used to store a common data structure, e.g., a hash table, that is then split into several partitions 404 in a manner which will be described below. Subsequently, CAME 400 can respond to application memory transactions by allocating or freeing specific parts of that chunk of memory. More specifically, the chunk of memory T 402 initially allocated by CAME is, according to these exemplary embodiments, cache page aligned. Then T is split up into n parts called partition, each of size $size_i$, which can be expressed as: T={$partition_o$, $partition_1$ K $partition_{n-1}$}. Note that, within each partition, the cache pages might not be contiguous in memory. The total size of the chunk of memory that is being allocated for the common data structure according to these exemplary embodiments is $$size(T) = \sum_{i=0}^{n-1} size_i,$$

where $size_i$ is a multiple of the cache page size. For example, each partition (e.g., split up into several cache pages) could contain cache lines for one processor core.

Figure 5:
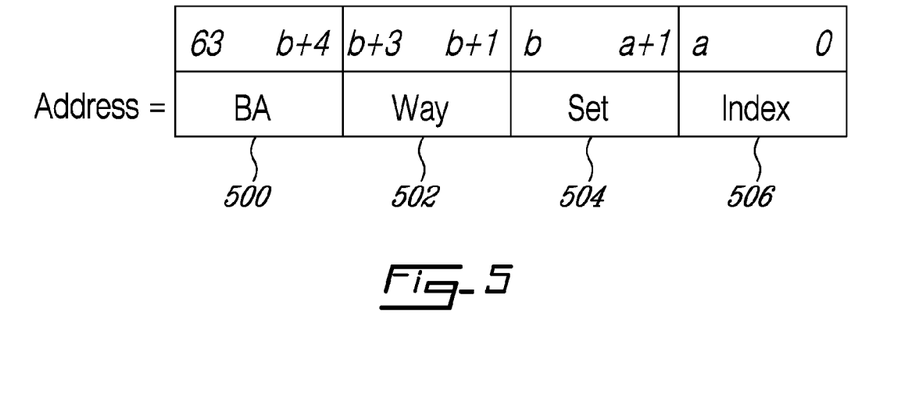
FIG. 5 shows an addressing format for cache memory according to an exemplary embodiment.

According to one exemplary embodiment, the address format used in the partitioned chunk of memory 402 can be that illustrated in FIG. 5. Therein, the BA field 500 contains the value of the memory chunk 402's base address and is aligned on a $2^{b+4}$ bit shift. The way field 402 contains a system value representing the set associativity order of the L2 cache 308. The set field 504 contains a value which guaranties that all corresponding pages are located in the same cache set (set numbering to generate these values according to exemplary embodiments is described in more detail below) and the way field 502 indicates which of the corresponding cache lines in the cache page resides in the set.

According to exemplary embodiments, the number of sets in a particular partition p created by CAME 400 can be defined as:

$$PSET_p = \frac{C_p}{W}, \quad (1)$$

where $C_p$ is the number of cache pages in partition p and W is the number of ways given by the set associativity of the cache. The set part in the address format used by CAME 400 to interact with the partitioned memory chunk 402 is, according to exemplary embodiments, numbered by the function S:

$$S(p,c) = (n \times c) + p, \quad (2)$$

where p is the partition number, n is total number of desired partitions (which could, for example, be the number of processors or cores), and c is the cache page index. Note that the number given by S represents an identifier for the set in a particular partition rather than the cache set index in the hardware.

The maximum value given by S should preferably be less than the total numbers of sets available in the L2 cache 308, otherwise some of the cache pages might overlap with each other. The value of CSET, i.e., the total number of cache sets in the L2 cache 308, can be defined as a function of the total cache size using this formula:

$$CSET = \frac{CS}{CLS \times W} \quad (3)$$

, where CS is the cache size in bytes. This, in turn, implies that the total number of cache pages C per system is:

$$C = \frac{CS}{CLS}. \quad (4)$$

The CAME 400 can size each partition in any desired manner to address various implementation criteria, e.g., network traffic. However, according to one purely illustrative exemplary embodiment, a fair share of the number of cache pages per partition ($C_p$) can be determined by calculating:

$$C_p = \frac{CS}{CLS \times n} \quad (5)$$

For example, in a 1 Mb, 8-way set associative L2 cache operating in a 64-bit multiprocessor system, equation (5) indicates that a maximum of 8192 cache pages, i.e., 65 Mb, can be allocated per partition.

Figure 6A:
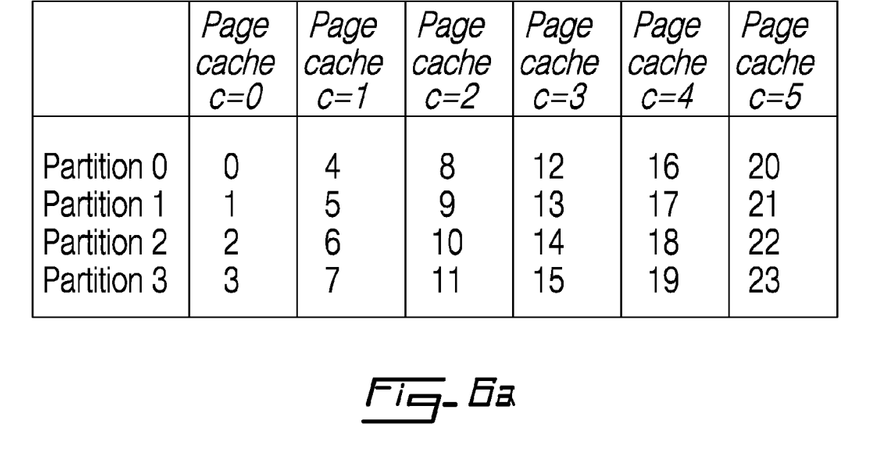
FIGS. 6(a) and 6(b) depict examples of cache set number according to exemplary embodiments.
Figure 6B:
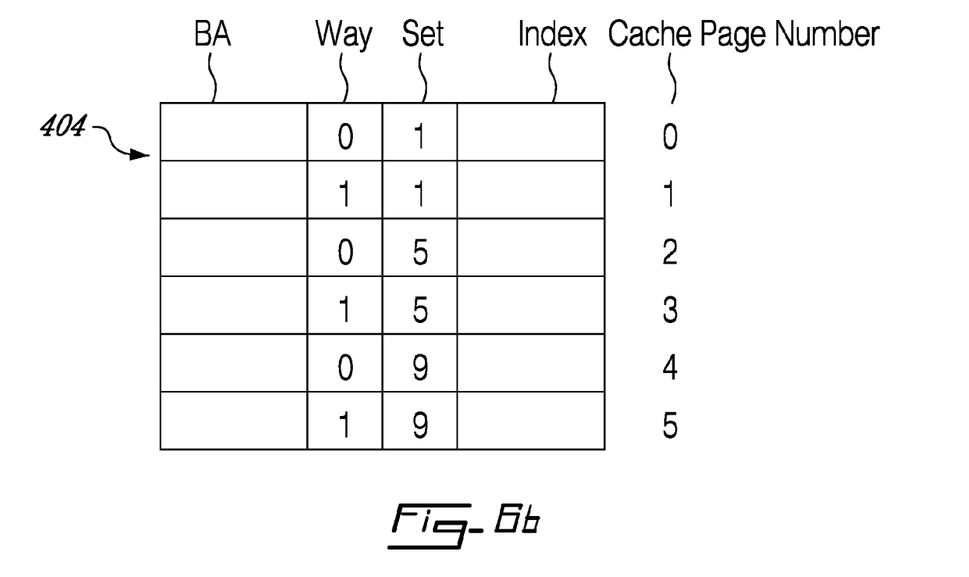

To illustrate how CAME 400 uses equations (1) and (2) to provide set numbering for partitions according to these exemplary embodiments, consider the exemplary embodiment illustrated in FIGS. 6(a) and 6(b). Therein, for an exemplary cache memory space 402 involving 4 partitions and 6 cache pages, the set numbering generated by equation (2) for each partition number/cache page combination would that illustrated in FIG. 6(a). FIG. 6(b) illustrates the way 502 and set 504 portions of memory addresses within the memory chunk 402 for one of these four partitions 404 in a 2-way set associative cache 308 (the BA and Index portions are left blank here, but would have values in implementation). Note that, in FIG. 6(b), equation (1) indicates that only three of the set values from FIG. 6(a) are used, i.e., 1, 5 and 9, since $PSET_p = 6/2$ or 3 for this illustrative example. The set values of FIG. 6(b) can, for example, map to the core 102 in the system of FIG. 1, in which case the partition 404 of FIG. 6(b) can then be used by CAME 400 for caching data corresponding to core 102.

Having described an exemplary scheme for partitioning memory in support of a common or shared data object according to these exemplary embodiments, such as a hash table, a brief discussion is now provided regarding the general operation of the CAME 400 to allocate memory using the partitioning described above. The total number of cache pages in a particular system will be known by the CAME 400 is known in advance when the system is initialized. The CAME 400, or more generally a memory allocator's task, is to maintain a list of all of the partitions created, e.g., as described above, and an indication in that list of the free/allocated cache pages per partition. The CAME 400 then builds up a table of all partitions, for example, at system boot or at any time before applications start running on the processors 100-106. In one exemplary embodiment, memory allocation performed by the application would specify the partition number and the size (aligned on a cache line size) of the memory block as, e.g., Alloc(p, size). However, the application should recognize that memory blocks crossing cache page boundaries might not be physically contiguous in memory.

According to one exemplary embodiment, CAME 400 only interacts with a system's memory allocation function in order to allocate the initial block of memory that will be partitioned for the common data structure of interest. Thus, any interaction between CAME 400 and e.g., a cache controller, is only implicit rather than direct. The addresses returned by the memory allocator should map with the cache controller's way of splitting addresses. In some implementations, the initial block of memory could, for example, be allocated using a kernel's low level memory allocation function. In other implementations this initial block of memory could be allocated at system bootup when, for example, the kernel discovers or initializes its RAM (which could require knowledge of physical I/O ports). It may be easier, but is not mandatory for these exemplary embodiments, to allocate the initial block of memory at boot time since it is usually easier to reserve a large chunk of contiguous memory for cache pages at this time.

Thus, it will be appreciated that the foregoing exemplary embodiments provide, among other things, for a set numbering algorithm which enables the CAME-controlled memory space to be readily extended or condensed by appending new cache pages for better control on misses. Although the total memory space to be managed by the CAME 400 is allocated in advance (e.g., system boot time), not all of that memory is necessarily used but the unused pages need not fall into the cache memory 308. Instead, the CAME memory space 402 can be resized by changing the number of cache pages C accordingly.

Figure 7:
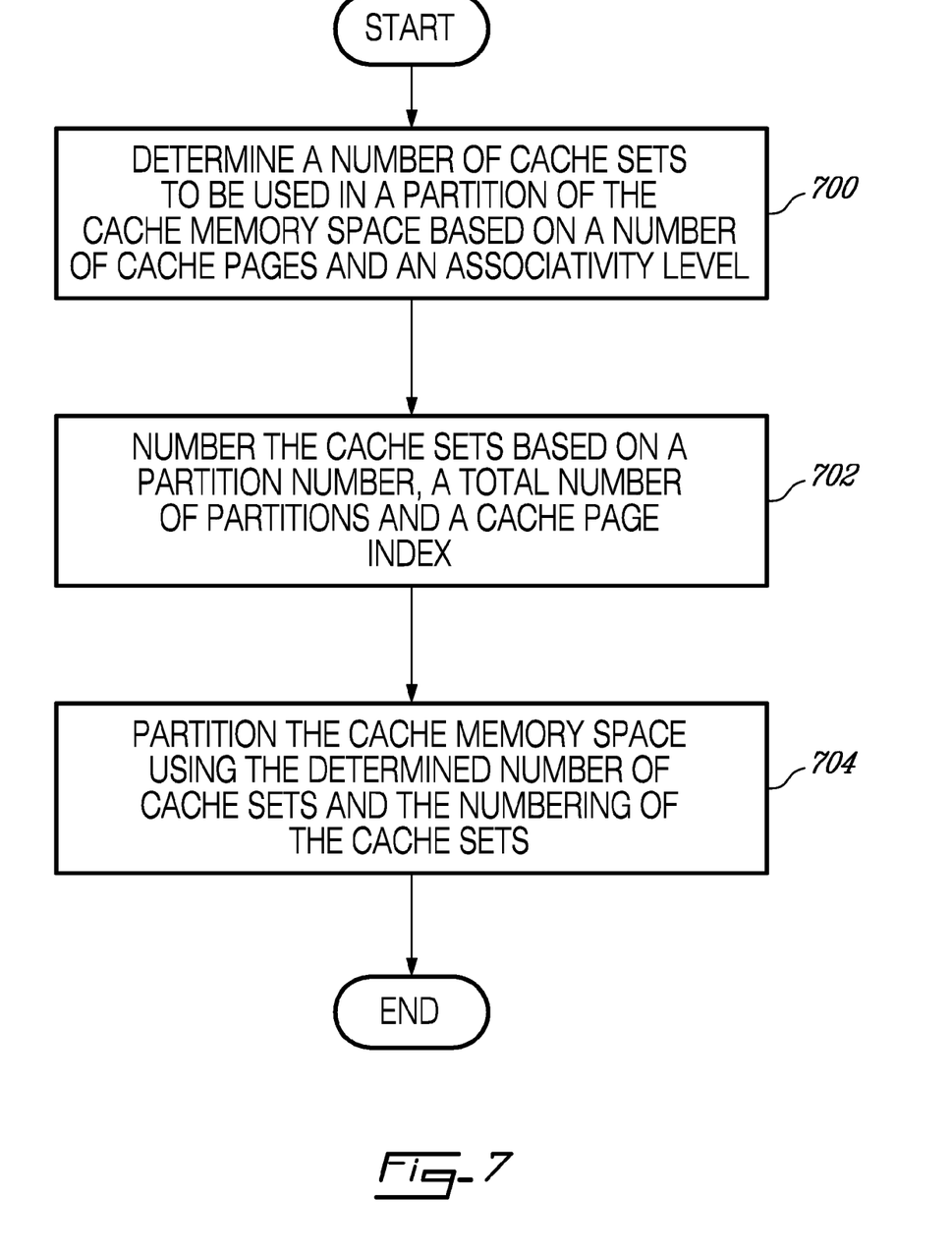
FIG. 7 is a flowchart illustrating a method of cache management according to an exemplary embodiment.

According to an exemplary embodiment, a method for managing a cache memory space can include the steps illustrated in the flowchart of FIG. 7. Therein, at step 700 a number of cache sets to be used in a partition of the cache memory space is determined based on a number of cache pages in the partition and an associativity level associated with the cache memory space. The cache sets are numbered, at step 702, based on a partition number, a total number of partitions and a cache page index. Then, the cache memory space can be partitioned using the determined number of cache sets and the numbering of the cache sets.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments provides illustration and description, but it is not intended to be exhaustive or to limit the invention to the precise form disclosed. Modifications and variations are possible in light of the above teachings or may be acquired from practice of the invention. For example, these exemplary embodiments are equally applicable to systems which employ either physical or virtual cache pages, which will vary based upon, for example, the processor architecture and the operating system kernel design in a given implementation. However, if the cache pages are virtual memory pages, the TLB 304 translation should preferably not impact the set numbering algorithm described above. The following claims and their equivalents define the scope of the invention.

The invention claimed is:

1. A method for managing a cache memory space having an associativity level associated therewith, said cache memory space being employed by a number of processor cores, said method comprising:
    determining a number n of partitions necessary in said cache memory space based on said number of processor cores, wherein each of said partitions:
        is assigned a partition number p; and
        is associated to one of said number of processor cores;
    determining a number of cache pages in each of said n partitions and a number of cache sets to be used in each of said n partitions based on said number of cache pages and said associativity level, wherein each of said cache pages is assigned a cache page index;
    numbering each of said cache sets of each of said n partitions based on its associated partition number p and cache page index; and
    partitioning said cache memory space into said n partitions using said determined number of cache sets of each of said n partitions and said numbering of said cache sets.

2. The method of claim 1, wherein said cache memory space is associated with a common data structure to be accessed in a set associative cache by an application running on said processor cores.

3. The method of claim 2, wherein said common data structure is a hash table.

4. The method of claim 2, wherein said set associative cache is an N-way Layer 2 (L2) cache having an associativity level of N.

5. The method of claim 1, wherein said step of determining said number of cache sets ($PSET_p$) further comprises:
    calculating $$PSET_p = \frac{C_p}{W},$$

where $C_p$, is a number of cache pages in partition p and W is a number of ways given by said associativity level.

6. The method of claim 1, wherein said step of numbering each of said cache sets further comprises:
    calculating $S(p,c)=(n\times c)+p$, where p is the partition number, n is the total number of partitions, and c is the cache page index.

7. The method of claim 1, further comprising:
    addressing said partitioned, cache memory space using an address format which includes a base address field, a way field, a set field and an index field.

8. The method of claim 1, further comprising:
    maintaining, by a memory engine, a list including each of said n partitions and a status of said cache pages in each of said n partitions as being one of free and allocated.

9. A system for managing a cache memory space comprising:
    a cache memory unit including said cache memory space;
    a number of processor cores that employ said cache memory space; and
    a processor configured for:
        determining a number n of partitions necessary in said cache memory space based on said number of processor cores, wherein each of said partitions:
            is assigned a partition number p; and
            is associated to one of said number of processor cores;
        determining a number of cache pages in each of said n partitions and a number of cache sets to be used in each of said n partitions based on said number of cache pages and an associativity level associated with said cache memory space;
        numbering each of said cache sets of each of said n partitions based on its associated partition number and cache page index; and
        partitioning said cache memory space into said n partitions using said determined number of cache sets of each of said n partitions and said numbering of said cache sets.

10. The system of claim 9:
    wherein said cache memory unit is a set associative cache; and
    wherein said cache memory space is associated with a common data structure to be accessed in said set associative cache by an application running on said number of processor cores.

11. The system of claim 10, wherein said common data structure is a hash table.

12. The system of claim 10, wherein said set associative cache is an N-way Layer 2 (L2) cache having an associativity level of N.

13. The system of claim 9, wherein said processor determines said number of cache sets ($PSET_p$) by:
    calculating $$PSET_p = \frac{C_p}{W},$$

where $C_p$, is a number of cache pages in partition p and W is a number of ways given by said associativity level.

14. The system of claim 9, wherein said processor numbers said cache sets by:
    calculating $S(p,c)=(n\times c)+p$, where p is the partition number, n is the total number of partitions, and c is the cache page index.

15. The system of claim 9, wherein said processor addresses said partitioned, cache memory space using an address format which includes a base address field, a way field, a set field and an index field.

16. The system of claim 9, further comprising:
a memory engine for maintaining a list including each of said n partitions and a status of said cache pages in each of said n partitions as being one of free and allocated.

17. A computer-readable medium containing instructions which, when executed on a computer, perform the steps of:
determining a number n of partitions necessary in said cache memory space based on said number of processor cores, wherein each of said partitions:
is assigned a partition number p; and
is associated to one of said number of processor cores;
determining a number of cache pages in each of said n partitions and a number of cache sets to be used in each of said n partitions based on said number of cache pages and said associativity level, wherein each of said cache pages is assigned a cache page index;
numbering each of said cache sets of each of said n partitions based on its associated partition number p and cache page index; and
partitioning said cache memory space into said n partitions using said determined number of cache sets of each of said n partitions and said numbering of said cache sets.

18. The computer-readable medium of claim 17, wherein said cache memory space is associated with a common data structure to be accessed in a set associative cache by an application running on said number of processor cores.

19. The computer-readable medium of claim 18, wherein said common data structure is a hash table.

20. The computer-readable medium of claim 18, wherein said set associative cache is an N-way Layer 2 (L2) cache having an associativity level of N.

21. The computer-readable medium of claim 17, wherein said step of determining said number of cache sets ($PSET_p$) further comprises:
calculating $$PSET_p = \frac{C_p}{W},$$

where $C_p$, is a number of cache pages in partition p and W is a number of ways given by said associativity level.

22. The computer-readable medium of claim 17, wherein said step of numbering said cache sets further comprises:
calculating $S(p,c)=(n\times c)+p$, where p is the partition number, n is the total number of partitions, and c is the cache page index.

23. The computer-readable medium of claim 17, further comprising:
addressing said partitioned, cache memory space using an address format which includes a base address field, a way field, a set field and an index field.

24. The computer-readable medium of claim 17, further comprising:
maintaining, by a memory engine, a list including each of said n partitions and a status of said cache pages in each of said n partitions as being one of free and allocated.

* * * * *